US009124439B1

(12) United States Patent
Li

(10) Patent No.: US 9,124,439 B1
(45) Date of Patent: Sep. 1, 2015

(54) PRESENCE STATUS BASED ROUTING SYSTEM AND METHOD

(75) Inventor: Shunge Li, Duluth, GA (US)

(73) Assignee: Cellco Partnership, Basking Ridge, NJ (US)

( * ) Notice: Subject to any disclaimer, the term of this patent is extended or adjusted under 35 U.S.C. 154(b) by 245 days.

(21) Appl. No.: 13/020,269

(22) Filed: Feb. 3, 2011

(51) Int. Cl.
*H04L 12/28* (2006.01)
*H04M 3/58* (2006.01)
*H04M 3/54* (2006.01)
*H04L 12/58* (2006.01)

(52) U.S. Cl.
CPC ............... *H04L 12/28* (2013.01); *H04L 51/04* (2013.01)

(58) Field of Classification Search
USPC ........................................................ 370/338
See application file for complete search history.

(56) References Cited

U.S. PATENT DOCUMENTS

| 6,826,405 | B2 * | 11/2004 | Doviak et al. ................. 455/445 |
| 6,907,031 | B1 * | 6/2005 | Ehlinger et al. .............. 370/352 |
| 8,665,864 | B1 * | 3/2014 | Delker et al. ................. 370/352 |
| 2002/0085516 | A1 * | 7/2002 | Bridgelall ..................... 370/329 |
| 2005/0141479 | A1 * | 6/2005 | Ozugur et al. ................ 370/351 |
| 2006/0291419 | A1 * | 12/2006 | McConnell et al. .......... 370/331 |
| 2007/0249291 | A1 * | 10/2007 | Nanda et al. ..................... 455/73 |
| 2008/0268816 | A1 * | 10/2008 | Wormald .................... 455/412.2 |
| 2008/0279161 | A1 * | 11/2008 | Stirbu et al. .................... 370/338 |
| 2009/0017865 | A1 * | 1/2009 | Cole et al. ................... 455/552.1 |
| 2009/0252059 | A1 * | 10/2009 | Vigue et al. .................... 370/254 |
| 2011/0149928 | A1 * | 6/2011 | Wu et al. ........................ 370/338 |
| 2011/0158209 | A1 * | 6/2011 | Lundsgaard et al. .......... 370/338 |
| 2012/0099562 | A1 * | 4/2012 | Smadi et al. ................... 370/332 |
| 2012/0184207 | A1 * | 7/2012 | Gaines et al. ................. 455/11.1 |
| 2013/0024949 | A1 * | 1/2013 | Baldwin et al. .................. 726/28 |

\* cited by examiner

*Primary Examiner* — Brian J Gillis
*Assistant Examiner* — Juan C Turriate Gastulo

(57) ABSTRACT

Data communications are selectively routed via an appropriate wireless access network including wireless cellular networks and wireless LAN, according to presence status of a mobile station. A network system tracks the presence status of the mobile station, which may relate to its availability and willingness to communicate via a particular type of wireless access network such as wireless LAN. With this kind of presence status information for a mobile station as guidance for traffic routing, inbound data communication can be routed to, and outbound data communication can be sent from, the mobile station, all via the desired access network. When applied to wireless LAN such as Wi-Fi network, this presence based routing mechanism can effectively reduce traffic burden over the wireless cellular network for the wireless carriers while lowering the cost of communication for the end users under usage based data plans.

18 Claims, 2 Drawing Sheets

PRESENCE STATUS BASED ROUTING SYSTEM AND METHOD

TECHNICAL FIELD

The present subject matter relates to techniques and equipment to control routing of traffic for a mobile station, as between access networks connected to the mobile station, based on presence status of the mobile station.

BACKGROUND

In recent years, mobile communication services have expanded and increased in popularity, around the world. Many advanced networks offer wireless mobile communication service for voice calls, mobile messaging services (e.g. text and/or multimedia) and a variety of data communications. The data services, for example, enable activities that often have been performed in computers, such as surfing the World Wide Web via a browser, but now from the convenience of a mobile station.

The introduction and rapid large scale adoption of smartphone type mobile stations has facilitated a still wider array of applications and services for mobile station users; and many of these applications and services involve high volume data communications. Unlimited data plans that a wireless carrier offers to its mobile station users, further, encourages data usage by these users. From the carrier's perspective high volumes of data traffic would increase its operating cost and may also lead to network congestion, reducing the ability of its network to provide all users with all of the desired services. For example, network congestion may compromise quality of voice calls.

To address concern of huge traffic volume due to data services, wireless carriers have tried to expand and upgrade their wireless network systems and to introduce usage-based data plans to economically control data traffic that goes through their networks. However, the network upgrades still cannot keep up with growth of data traffic volume. In addition, some mobile users cannot afford their communication demands under the usage-based data plans.

In addition to communication via traditional 3G and/or 4G cellular networks (or wireless Wide Area Network, or WWAN), many mobile communication devices, such as smartphones, nowadays have the capability of communicating over the Internet through different types of wireless connections, such as a wireless Local Area Network, or WLAN. A WLAN provides flexible network connectivity, making it possible for mobile data users to stay connected as they move freely within a building, around a campus, or in public hot spots (e.g. airports, hotels, and other public spaces). Wi-Fi (or sometimes WiFi) is a trademark of the Wi-Fi Alliance, which is used to describe wireless connectivity technologies for a WLAN based on the IEEE 802.11 standards.

Because of its popularity and availability in public and private points of interest, Wi-Fi is considered an alternate connectivity option by both carriers and mobile users. Use of Wi-Fi may sometimes even be preferred by both the carriers and the mobile station users. From the carrier's perspective, offload of traffic via Wi-Fi decreases use of more costly Radio Frequency (RF) resources of the cellular network by those who are still under unlimited data plan. From the mobile station user's perspective, the Wi-Fi network may offer faster data speeds compared to the 3G cellular network, and/or the use of Wi-Fi network may provide economic advantages under usage-based billing arrangement.

Decisions as to whether or not a Wi-Fi network should be used in place of 3G or 4G cellular network, however, have traditionally been made based on location, time, data content type and size, and data usage. While these approaches work well in outbound communication scenarios, they neither work well with inbound communications, nor consider the presence status of the mobile station user. For example, when a mobile station user is in an area where a Wi-Fi network is available and is actually connected to the Wi-Fi network, the carrier may still transmit an inbound video call via its cellular network, not via the Wi-Fi network to the mobile station user, even though the intended recipient may prefer Wi-Fi network for video calling, since the cellular network does not consider willingness of the mobile station user.

Thus, a need exists for selectively routing the traffic between the wireless cellular network (WWAN) and the Wi-Fi network (WLAN), in a more effective manner.

SUMMARY

The teachings herein improve the selective routing of traffic for a mobile station by determining whether or not to use an appropriate wireless access network based on presence status of the mobile station user.

For example, a method may track the presence status of a user carrying a mobile station with both cellular network and wireless local area network (WLAN) communication capabilities, in response to one or more presence status messages from the mobile station. A data communication destined for the mobile station is received by a core network; based upon the tracked presence status of the mobile station user, it is determined whether the mobile station is accessible through a WLAN when the data communication is received. Upon determining that the mobile station is accessible through the WLAN and that the mobile station user is willing and available to communicate via the WLAN, the network routes the data communication to the mobile station user through the WLAN.

When another data communication for the mobile station is received by the core network, however, if the tracked presence status of the mobile station indicates that the mobile station user is not willing to be accessible through a WLAN or if the mobile station is not even connected to a WLAN, then the other data communication for the mobile station is routed through the wireless cellular network.

The presence status of the mobile station, namely its availability and willingness to communicate over an appropriate access network, give the core network additional piece of information for making traffic routing decision for inbound traffic. This information can be used by the mobile communication device to select the desired access network for outbound traffic as well.

The selective routing may be implemented in a variety of systems and networks.

In a discussed example, one or more presence status messages from the mobile station are received in a presence server and the presence status of the mobile station is stored in the presence server. The data communication is received, managed and routed in an Internet Protocol Multimedia Subsystem (IMS) core network, and a network element, namely, Traffic Routing Application Server (TRAS), is introduced to maintain the presence-based routing logic as pertaining to each individual mobile station user and to provide IMS core network with the routing logic upon request during run time traffic routing. The TRAS routing function may entail answering a query from IMS instructing the IMS to route the data communication for the mobile station through an appropriate access network, based upon the current presence status of the mobile station user, namely, the user's willingness to be accessible through the access network if the mobile station is indeed connected to the access network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples discussed herein relate to routing call or data traffic with selection between the wireless cellular network and the wireless LAN network according to presence status of a mobile station. A network system tracks the presence status of the mobile station which has both wireless cellular communication capabilities and wireless LAN communication capabilities. The presence status of the mobile station may indicate the mobile station's availability and willingness to use the wireless LAN network for communication purposes. If the mobile station is accessible via the wireless LAN network, the data communication is routed to the mobile station via the wireless LAN network. This routing of data communication based upon availability and willingness of the mobile station to use the wireless LAN network effectively reduces data traffic burden on the wireless cellular network. From the end user's perspective, it may also reduce costs of data communications.

The selection of routing, as between a cellular access network and WLAN data transport, based on presence status may be implemented in a variety of network architectures. For discussion purposes, the subject matter will be explained based on the IP Multi-media Subsystem (IMS) architecture that supports both a wireless LAN network connectivity and a wireless cellular network connectivity. IP Multi-media Subsystem (IMS) is a service architecture developed for IP packet switched networks for rapidly deploying new IP based multimedia services. Originally developed as an extension of GSM (Global System for Mobile) wireless networking standards, the IMS paradigm has been extended to other types of wireless/mobile network technologies as well as landline networks, such as advanced digital cable television/telephone network deployments. The IMS architecture developed for third generation (3G) mobile networks is now being adopted for fourth generation (4G) mobile networks.

Figure 1:
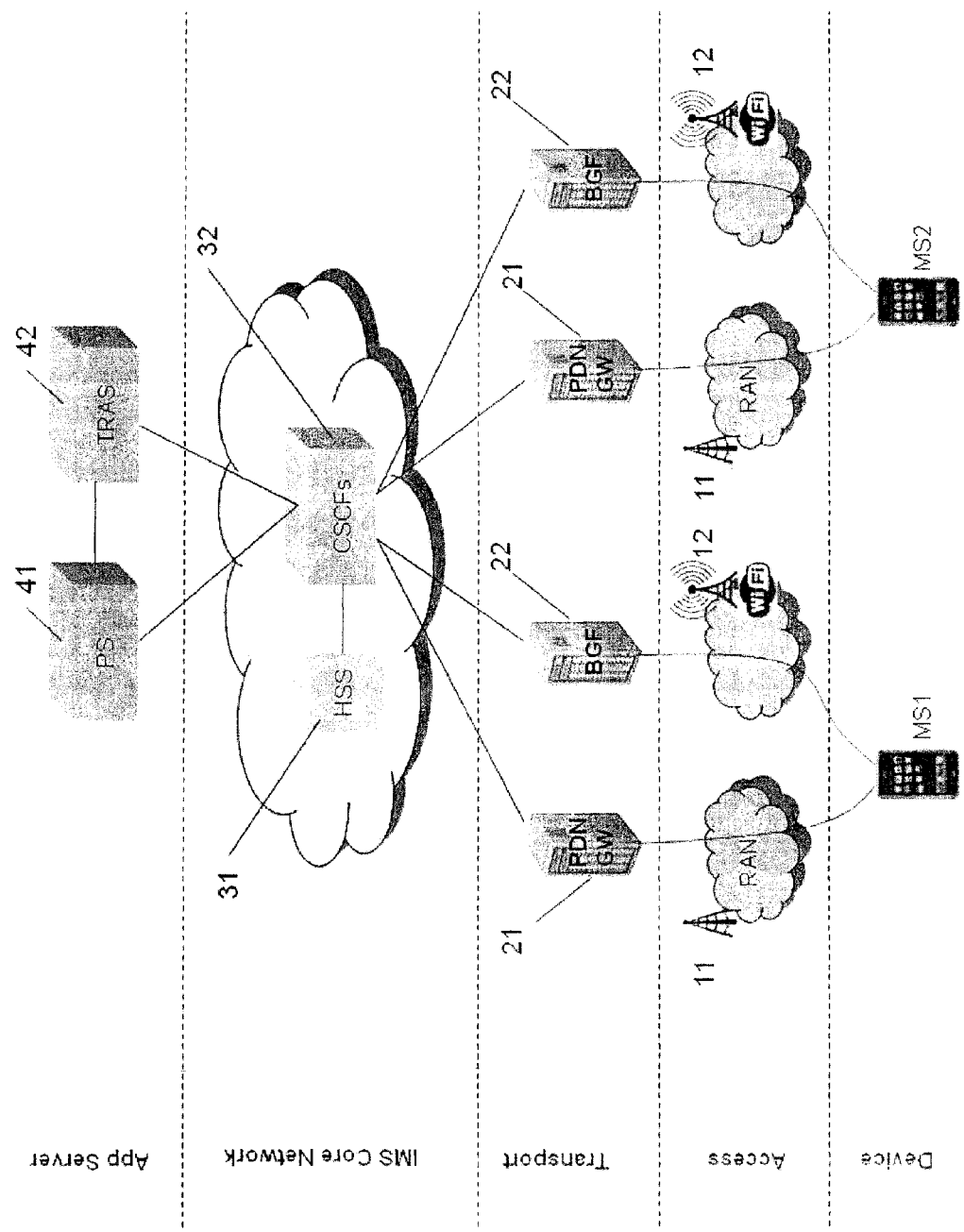
FIG. 1 is a high-level functional block diagram of an example of a system of networks/devices that provide various communications for mobile stations and support an example of selective routing of data communications based on presence status of a mobile station.

FIG. 1 illustrates the elements of an IMS based network architecture as may be involved in routing data communications based on presence status of a mobile station. In the example, the top layer is an application layer, whereas the user equipment (UE) devices represent mobile stations that are involved in some sort of communications. The access layer indicates various wireless access networks the UEs may have access to at any given time. It provides UEs with wireless connectivity to the core network. The transport layer hides access network-specific connectivity and transport details from IMS core network. The IMS layer is access network agnostic and provides a variety of multimedia service management and control functions For purposes of this discussion, this network architecture diagram is much simplified, in order to illustrate the core idea of this teaching and to focus on the elements as may be involved in routing the data communication based on the presence status of the mobile station.

In this example, the access layer includes a number of radio access networks (RANs) providing wireless network access to mobile stations. Physical elements of the mobile radio access networks include a number of base stations (BSs) 11, two of which are shown for convenience. The access layer also includes one or more access points 12. Each base station 11 is equipped with an antenna system and a base transceiver system (BTS). The base transceiver system (BTS) communicates via the antenna system and the air-link with one or more mobile stations that are in its coverage area, using appropriate frequencies and protocols. Also depicted in this example are a couple of Wi-Fi access points, to which mobile stations MS1 and MS2 each are connected.

In this example, mobile stations MS1 and MS2, may take the form of portable handsets such as smartphones, with display and user input capabilities to support multimedia communications, although they may be implemented in other form factors. Other examples of mobile stations may take the form of a notebook, netbook, tablet or other portable personal computer (PC), incorporating a wireless transceiver compatible with a particular type of wireless packet data service offered by the network.

Border Gateway Function (BGF) 22 in the transport layer is a network element located in between the IMS core network and the access network that contains the Wi-Fi access point 12. Each BGF 22 performs network address translation (NAT) functions under the control of the serving policy decision function. Each Packet Data Network Gateway (PDN GW) 21 provides connectivity between mobile stations and external packet data networks (IMS packet core network) by being the point of exit and entry of traffic for the respective mobile stations. A mobile station MS1 or MS2 may have simultaneous connectivity with more than one PDN GW 21 for accessing multiple Packet Data Networks. The PDN GW 21 performs policy enforcement, packet filtering for each user, charging support, lawful Interception, packet screening, etc.

The IMS core network provides a variety of access agnostic service management and control related functions and interfaces for various IP multimedia applications. Key to the discussion of this example is two sets of IMS network functions: Home Subscriber Server (HSS) 31 and Call Session Control Functions (CSCFs) 32. HSS 31 is a repository for all the data about subscribers and their subscriptions in the IMS network. These data are typically used for the purposes of identity management, subscriber authentication, and service authorization.

CSCFs 32 is a collection of different types of CSCFs in IMS network. There are four types of CSCF functional elements in IMS network, namely Proxy CSCF (P-CSCF), Interrogating CSCF (I-CSCF), Serving CSCF (S-CSCF), and Emergency CSCF (E-CSCF). Collectively, they are responsible for session control and call routing. For simplicity, they are shown as one logical function, CSCFs 32, in FIG. 1.

A Presence Server (PS) 41 is where the presence status information of a mobile station user is stored. For each mobile station user, the Presence Server also maintains a list of mobile station users who are authorized by the mobile station user to received the presence status information. All motion station users involved in presence status based routing must be registered in advance with the Presence Server via IMS core network. Furthermore, a motion station user must be pre-authorized by another mobile station for privacy protection purpose before the former can receive the presence status of the latter. It is assumed in the example that both MS1 and MS2 are registered with Presence Server 41 and MS1 is authorized by MS2 to be able to monitor the presence status of MS2.

A presentity is an entity that has presence information associated with it. Mobile station users can be considered presentities if they are involved in some kind of presence service. A watcher is a party who is interested in the presence information of a presentity. A watcher has to be authorized by a presentity in order to receive the presence information of the presentity. Both presentities and watchers can be either human being or their software proxies, or software programs.

A Traffic Routing Application Server (TRAS) 42 is introduced as an extension to the current IMS architecture in support of presence based traffic routing. TRAS works jointly with the IMS core network to make the routing decision. Its main function is to select an appropriate network to route traffic over at any given time for a presentity based on its presence status. TRAS maintains the presence-based routing logic for all the presentities, therefore, it must have access to all the presentities' presence information and must be an authorized watcher to all these presentities. TRAS queries Presence Server to retrieve a presentity's presence information, and determines the access network for routing based on the locally stored routing logic for the presentity, and returns the access network to CSCFs as a guidance in traffic routing. To reduce the network traffic, TRAS may cache a presentity's presence information locally and update it only when it is notified of the presence status change for the presentity.

TRAS is a logical entity. In an actual implementation, its function may be incorporated into an existing network element.

Similar to the presence status on Instant Messaging (IM) platform, a person's presence status on Wi-Fi network can be availability-based, with values for example ranging from 'Available', 'Do Not Disturb', 'In-Session', to 'Off Network'. If a person is 'Available' on the Wi-Fi network, is connected to a Wi-Fi access point, and specifies a presence-based routing rule to route traffic over Wi-Fi network under 'Available' status, then the inbound and outbound data traffic for the user's mobile station will be routed over the Wi-Fi network.

Hence, the presence status information maintained in PS 41 may be presence status of a mobile station relating to the Wi-Fi network or the wireless network. In this example, the presence status is focused on the presence status of a mobile station regarding its availability on a Wi-Fi network. The presence status may be "Available on a Wi-Fi Network," "Unconnected to a Wi-Fi network," and "Busy on a Wi-Fi network."

Figure 2:
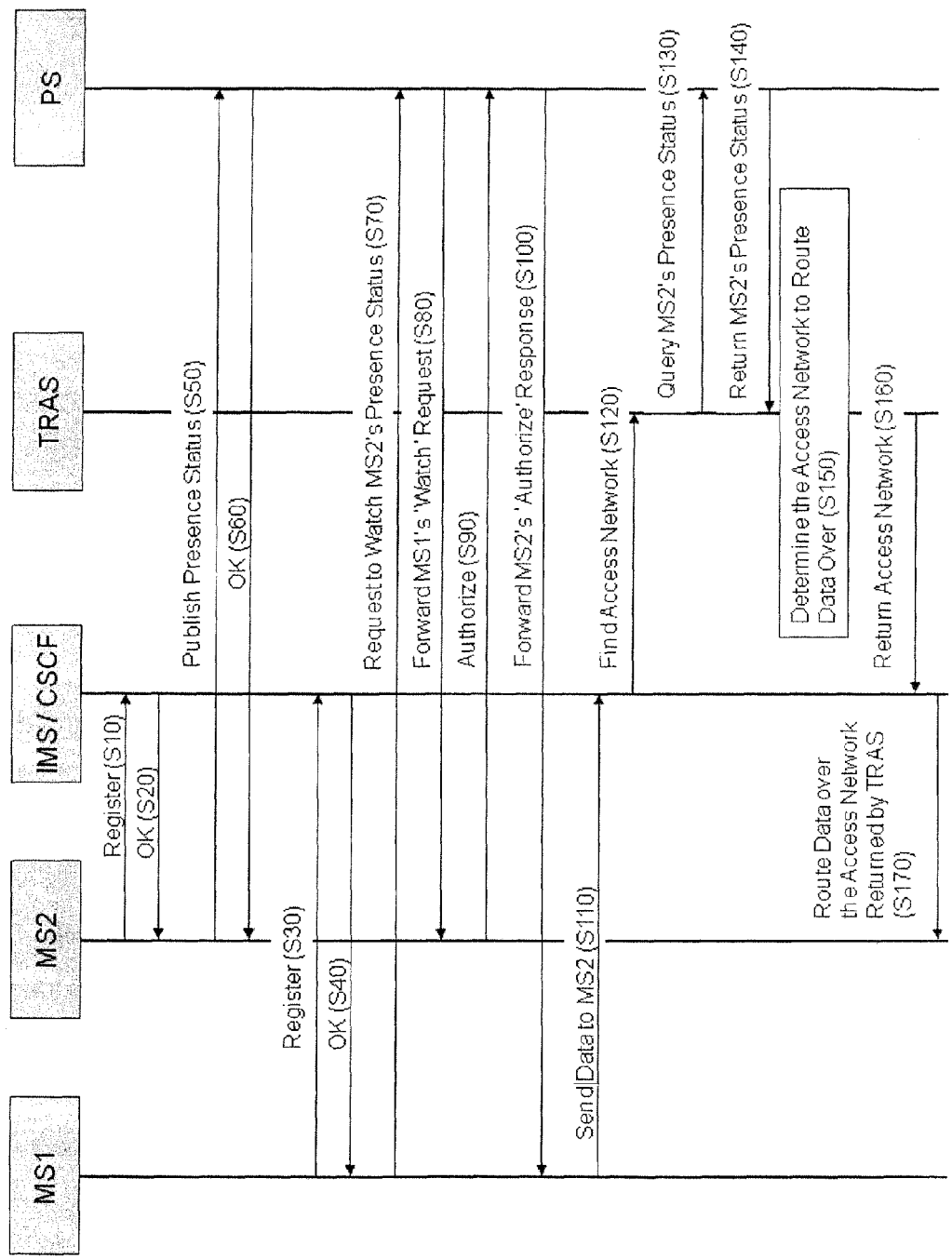
FIG. 2 is a sequence diagram illustrating a procedure to route data communications with selection between a Wi-Fi network and a wireless 4G network, based on the presence status of a mobile station.

FIG. 2 is a sequence diagram illustrating a procedure of presence-based traffic routing between several access networks to which MS1 and MS2 are connected. MS1 is the calling party and MS2 is the called party. Initially, both MS1 and MS2 register with the IMS core network (S10, S30) in order to participate in the presence status based routing service. S20 and S40 indicate that both registrations are successful.

MS2 publishes its current presence status to Presence Server (S50), say, "Available on Wi-Fi Network". Presence Server acknowledges that it has received and stored the presence status in the Presence Server (S60). MS1 further requests to be a watcher of MS1 by sending a 'Watch' request to the Presence Server (S70). Presence Server forwards the request to MS2 (S80), who indicates its approval of the request in its user interface and returns an 'Authorize' message to Presence Server (S90), which in turn forwards the message back to MS1 (S100).

After receiving authorization from MS2, MS1 initiates a data communication (S110). Upon receiving the data from MS1, IMS/CSCFs queries TRAS for routing guidance for the data communication destined to MS2 (S120). TRAS either queries the Presence Server (S130), or uses its local cache to retrieve the current presence status for MS2, which in this example is "Available on Wi-Fi Network". TRAS then checks its locally stored routing logic for MS2 against the presence status received from the Presence Server to derive the access network for use (S150). In this example, MS2 had indicated to use Wi-Fi network if MS2 is 'Available on Wi-Fi Network'. As a result, TRAS returns 'Wi-Fi Network' to IMS/CSCFs as guidance for data routing (S160).

Upon validation that MS2 is indeed connected to a Wi-Fi network, IMS/CSCFs routes the data to MS2 over Wi-Fi network as guided by TRAS (S170).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   tracking, by at least one server, presence status of a called mobile station having a first wireless access network communication capability and a second wireless access network communication capability, in response to one or more presence status messages received from the called mobile station, the one or more presence status messages received from the called mobile station indicating when the called mobile station is accessible to communicate over an identified one of the access networks and indicating when the mobile station is willing to communicate over an identified one of the access networks;
   receiving, by the at least one server, initiations of data communications for the called mobile station each indicating that another calling device is requesting to perform data communication with the called mobile station;
   based upon the tracked presence status received from the called mobile station, determining, by the at least one server, whether the called mobile station is accessible through the second wireless access network when each initiation of the data communication is received;

upon determining, by the at least one server, that the called mobile station is not accessible through the second wireless access network, routing a data communication to the called mobile station through the first wireless access network;

upon determining, by the at least one server, that the tracked presence status received from the called mobile station indicates 1) that the called mobile station is accessible through the second wireless access network and 2) that the called mobile station is not willing to communicate over the second access network, routing a data communication to the called mobile station through the first wireless access network; and upon determining, by the at least one server, that the tracked presence status received from the called mobile station indicates 1) that the called mobile station is accessible through the second wireless access network and 2) that called mobile station is willing to communicate over the second access network, routing a data communication to the called mobile station through the second wireless access network, without routing the data communication to the called mobile station through the first wireless access network, wherein the tracked presence status includes at least one of the values of available, Do Not Disturb, In-Session, Off Network or Busy on Network to indicate the availability and willingness of the mobile station to communicate over the identified network.

2. The method of claim 1, wherein the first wireless access network is a wireless wide area network (WWAN), and the second wireless access network is a wireless local area network (WLAN).

3. The method of claim 2, wherein:
the received data communication is an incoming data communication addressed to the called mobile station; and
the routing step comprises routing the incoming data communication through the WLAN to the called mobile station, without routing the data communication for the called mobile station through the at least one access point of the WWAN.

4. The method of claim 2, wherein:
the received data communication is an outgoing data communication from the called mobile station; and
the routing step comprises routing the data communication through the WLAN from the called mobile station to a destination.

5. The method of claim 2, wherein:
the tracking step comprises receiving the one or more presence status messages from the called mobile station in a presence server and storing presence status of the called mobile station in the presence server in response to the one or more received presence status messages;
the data communication is received in an Internet Protocol Multimedia Subsystem (IMS);
the determining step comprises receiving a routing instruction request from the IMS in a Traffic Routing Application Server (TRAS), and in response, obtaining current presence status of the called mobile station from the presence server; and
the routing step comprises sending an instruction from the TRAS to the IMS instructing the IMS to route the data communication for the called mobile station through the WLAN, based upon the current presence status indicating that the called mobile station is accessible through the WLAN and willing to communicate through the WLAN.

6. The method of claim 1, wherein the presence status is derived from at least one presence source including an application running on the called mobile station or the called mobile station user.

7. The method of claim 2, wherein the presence status of the called mobile station on the WLAN is disclosed to a group of mobile station users to whom disclosure of the presence status is permitted.

8. A network comprising:
a first wireless access network;
a second wireless access network;
a routing system for selectively routing communications for a called mobile station through the first wireless access network and the second wireless access network, the called mobile station having both a first wireless access network communication capability and a second wireless access network communication capability;
a presence server for storing presence status of the called mobile station in response to one or more presence status messages received from the called mobile station, the presence status messages indicating when the called mobile station is accessible to communicate over an identified one of the access networks and indicating when the mobile station is willing to communicate over an identified one of the access networks; and
a controller for the routing system, wherein the controller is configured to:
(a) determine whether the called mobile station is accessible through the second wireless access network when an initiation of a data communication for the called mobile station is received from a calling device, based upon the presence status received from the called mobile station stored in the presence server, the initiation indicating that the calling device is requesting to perform data communication with the called mobile station;
(b) selectively cause the routing system to route a data communication for the called mobile station through the first wireless access network upon determining that the presence status received from the called mobile station indicates that the called mobile station is not accessible through the second wireless access network;
(c) selectively cause the routing system to route a data communication for the called mobile station through the first wireless access network upon determining that the presence status received from the called mobile station indicates: 1) that the called mobile station is accessible through the second wireless access network, and 2) that the called mobile station is not willing to communicate over the second wireless access network; and
(d) selectively cause the routing system to route a data communication for the called mobile station through the second wireless access network upon determining that the presence status received from the called mobile station indicates: 1) that the called mobile station is accessible through the second wireless access network, and 2) that the called mobile station is willing to communicate over the second wireless access network, without routing the data communication for the called mobile station through the first wireless access network,
wherein the presence status includes at least one of the values of available, Do Not Disturb, In-Session, Off Network or Busy on Network to indicate the availability and willingness of the mobile station to communicate over the identified network.

9. The network of claim 8, wherein the first wireless access network is a wireless wide area network (WWAN), and the second wireless access network is a wireless local area network (WLAN).

10. The network of claim 8, wherein:
the routing system is an Internet Protocol Multimedia Subsystem (IMS); and
the controller comprises a Traffic Routing Application Server (TRAS).

11. The network of claim 8, wherein the IMS comprises:
a Call Session Control Functions (CSCF); and
a Home Subscriber Server (HSS).

12. The network of claim 9, wherein the presence server stores presence status regarding availability and willingness of the called mobile station to communicate via the WLAN.

13. The network of claim 8, wherein the presence status is derived from at least one presence source including an application running on the called mobile station or the called mobile station user.

14. The method of claim 5, wherein the presence server receives and processes requests from devices requesting to track the presence of the called mobile station.

15. The method of claim 14, wherein the presence server authorizes the devices to track the called mobile station and maintains a list of the devices that are authorized.

16. The method of claim 15, wherein the TRAS is authorized by the presence server to track the called mobile station and other mobile stations in the first wireless access network and the second wireless access network.

17. The method of claim 1, wherein the data communication is routed to the called mobile station through the first or second wireless access network without the called mobile station selecting between the first and second wireless access network.

18. The network of claim 8, wherein the controller is further configured to cause the routing system to route the data communication to the called mobile station through the first or second wireless access network without the called mobile station selecting between the first and second wireless access network.

* * * * *